United States Patent [19]

Murai

[11] Patent Number: 4,667,250

[45] Date of Patent: May 19, 1987

[54] HALFTONE DIGITAL IMAGE PROCESSING DEVICE

[75] Inventor: Kazuo Murai, Tokyo, Japan

[73] Assignee: Ricoh Company, Ltd., Tokyo, Japan

[21] Appl. No.: 870,922

[22] Filed: Jun. 5, 1986

[30] Foreign Application Priority Data

Jun. 19, 1985 [JP] Japan .................................. 60-133372

[51] Int. Cl.⁴ ................................................ H04N 1/40
[52] U.S. Cl. ..................................... 358/283; 358/298
[58] Field of Search ...................... 358/280, 283, 298; 382/4150; 364/515

[56] References Cited

U.S. PATENT DOCUMENTS

| | | | |
|---|---|---|---|
| 4,246,614 | 1/1981 | Knox ..................................... | 364/515 |
| 4,288,821 | 9/1981 | Lavallee et al. ...................... | 358/283 |
| 4,551,768 | 11/1985 | Tsuchiya et al. .................... | 358/283 |
| 4,554,594 | 11/1985 | Ciardiecco .......................... | 358/283 |
| 4,556,916 | 12/1985 | Matsunawa .......................... | 358/280 |

*Primary Examiner*—Edward L. Coles, Sr.
*Attorney, Agent, or Firm*—Mason, Fenwick & Lawrence

[57] ABSTRACT

Processing used to represent a gradation by changing the number of black pixels and the number of white pixels in a matrix of 8×8 pixels. First, edge information sampled from the input data is allocated to corresponding pixel positions of the output data with priority. A residual gradation value is determined by subtracting a value corresponding to the edge information already allocated from the average gradation of the input data, and black pixels and white pixels are alternately allocated to the remaining pixel positions of the output data except for the edge region, in accordance with the ratio of the number of those remaining pixels to the residual gradation value. When the region except for the edge region is divided into a plurality of regions, an average gradation for each of the divided regions is determined and a residual gradation value is distributed to each of the divided regions in accordance with the ratio between the average gradations, followed by allocating black pixels and white pixels to each of the divided regions in accordance with the ration of the distributed residual gradation value to the number of pixels in that region.

5 Claims, 19 Drawing Figures

Fig.4a
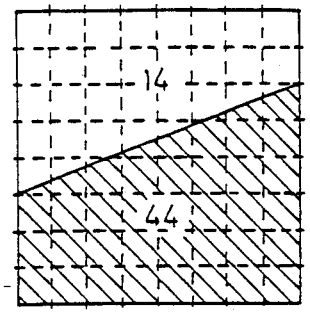
Fig.4b
| 15 | 16 | 15 | 14 | 14 | 14 | 15 | 15 |
|---|---|---|---|---|---|---|---|
| 15 | 14 | 14 | 14 | 15 | 15 | 16 | 15 |
| 14 | 15 | 14 | 15 | 15 | 20 | 30 | 40 |
| 15 | 15 | 17 | 25 | 40 | 42 | 45 | 44 |
| 20 | 35 | 42 | 44 | 44 | 44 | 44 | 44 |
| 44 | 44 | 45 | 44 | 44 | 44 | 44 | 44 |
| 44 | 44 | 44 | 44 | 45 | 44 | 44 | 44 |
| 44 | 44 | 44 | 44 | 44 | 44 | 44 | 44 |
Fig.4c
| 0 | 32 | 8 | 48 | 2 | 34 | 10 | 42 |
|---|---|---|---|---|---|---|---|
| 48 | 16 | 56 | 24 | 50 | 18 | 58 | 26 |
| 12 | 44 | 4 | 36 | 14 | 46 | 6 | 38 |
| 60 | 28 | 52 | 20 | 62 | 30 | 54 | 22 |
| 3 | 35 | 11 | 43 | 1 | 33 | 9 | 41 |
| 51 | 19 | 59 | 27 | 49 | 17 | 57 | 25 |
| 15 | 47 | 7 | 39 | 13 | 45 | 5 | 37 |
| 63 | 31 | 55 | 23 | 61 | 29 | 53 | 21 |
Fig.4d
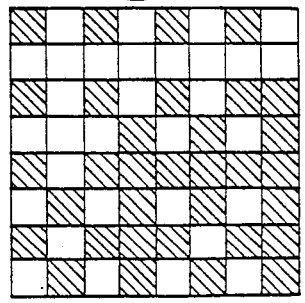
Fig.4e
| 58 | 53 | 39 | 28 | 27 | 42 | 54 | 59 |
|---|---|---|---|---|---|---|---|
| 48 | 40 | 21 | 14 | 13 | 20 | 41 | 49 |
| 34 | 22 | 10 | 4 | 3 | 9 | 19 | 35 |
| 29 | 15 | 5 | 1 | 2 | 8 | 18 | 32 |
| 38 | 23 | 11 | 6 | 7 | 12 | 26 | 37 |
| 52 | 45 | 24 | 16 | 17 | 25 | 44 | 51 |
| 62 | 56 | 46 | 30 | 31 | 43 | 55 | 61 |
| 63 | 57 | 47 | 33 | 36 | 50 | 60 | 63 |
Fig.4f
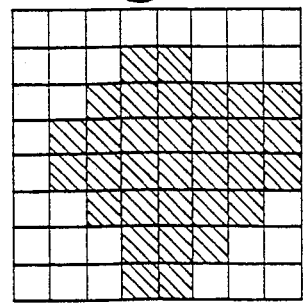

Fig.5b

| -2 | 13 | 4 | -4 | -3 | -8 | 1 | -1 |
|---|---|---|---|---|---|---|---|
| 5 | -10 | -6 | -6 | 1 | -24 | -20 | -85 |
| -9 | 5 | -22 | -42 | -96 | -82 | 2 | 101 |
| -32 | -74 | -97 | -47 | 105 | 73 | 72 | 24 |
| 106 | 57 | 94 | 72 | 29 | 7 | 0 | -1 |
| 81 | 42 | 25 | -1 | -2 | -1 | 0 | 0 |
| 0 | -1 | -2 | -3 | 12 | -2 | 0 | 0 |
| 0 | 0 | 0 | -1 | -2 | -1 | 0 | 0 |

Fig.5c

| 13 | 29 | 19 | 10 | 11 | 6 | 16 | 14 |
|---|---|---|---|---|---|---|---|
| 18 | 4 | 8 | 8 | 16 | -9 | -4 | -77 |
| 5 | 20 | -8 | -27 | -81 | -60 | 32 | 141 |
| -17 | -59 | -80 | -22 | 145 | 115 | 117 | 68 |
| -86 | 92 | 136 | 116 | 73 | 51 | 44 | 43 |
| 125 | 86 | 70 | 43 | 42 | 43 | 44 | 44 |
| 44 | 43 | 42 | 41 | 57 | 42 | 44 | 44 |
| 44 | 44 | 44 | 43 | 42 | 43 | 44 | 44 |

Fig.5d

| A | A | A | A | A | A | A | A |
|---|---|---|---|---|---|---|---|
| A | A | A | A | 0 | 0 | 0 | 0 |
| A | A | 0 | 0 | 0 | 0 | A | 1 |
| 0 | 0 | 0 | 0 | 1 | 1 | 1 | 1 |
| 0 | 1 | 1 | 1 | 1 | A | A | A |
| 1 | 1 | 1 | A | A | A | A | A |
| A | A | A | A | A | A | A | A |
| A | A | A | A | A | A | A | A |

Fig.5e

|   | a | b | c | d | e | f | g | h |
|---|---|---|---|---|---|---|---|---|
| 1 | A | A | A | A | A | A | A | A |
| 2 | A | A | A | A | 0 | 0 | 0 | 0 |
| 3 | A | A | 0 | 0 | 0 | 0 | B | 1 |
| 4 | 0 | 0 | 0 | 0 | 1 | 1 | 1 | 1 |
| 5 | 0 | 1 | 1 | 1 | 1 | C | C | C |
| 6 | 1 | 1 | 1 | C | C | C | C | C |
| 7 | C | C | C | C | C | C | C | C |
| 8 | C | C | C | C | C | C | C | C |

Fig.5f

| 1 | 0 | 0 | 0 | 0 | 1 | 0 | 0 |
|---|---|---|---|---|---|---|---|
| 0 | 0 | 1 | 0 | 0 | 0 | 0 | 0 |
| 0 | 0 | 0 | 0 | 0 | 0 | 0 | 1 |
| 0 | 0 | 0 | 0 | 1 | 1 | 1 | 1 |
| 0 | 1 | 1 | 1 | 1 | 0 | 1 | 1 |
| 1 | 0 | 1 | 0 | 1 | 1 | 0 | 1 |
| 1 | 0 | 1 | 1 | 0 | 1 | 1 | 0 |
| 1 | 1 | 0 | 1 | 1 | 0 | 1 | 1 |

HALFTONE DIGITAL IMAGE PROCESSING DEVICE

BACKGROUND OF THE INVENTION

The invention relates to a halftone digital image processing device, in particular, to an improvement in the resolution of information, such as characters and line drawings, processed by a device in which a halftone representation is performed using an area gradation method.

When recording images based on the dot matrix technique, a conventional recording device can adjust a density level of each of dots in order of four grades at maximum. In a digital color reproduction machine by way of example, however, a gradation representation of 64 grades is generally required for each of basic recording colors such as yellow (Y), magenta (M), cyan (C) and black (BK).

In case of such a multi-level representation, it has been customary heretofore that a relatively large dot region comprising a plurality of dots (e.g., $8 \times 8$) is defined as a unit of gradation processing region, and both the number of recording dots and the number of non recording dots are adjusted for each dot region to represent a density level of each gradation processing region. The halftone representation method of this type is called as an area gradation method.

A gradation representation using the area gradation method is mainly divided into a density pattern method and a dither method. For the density pattern method, the average density in a given processing region (e.g., $8 \times 8$) is determined and the resulting density is compared with each of values of a threshold table which have been present for each pixel of the processing region. The result of this comparison produces binary data of "1" or "0" for each pixel.

For the dither method, input data of each pixel is directly compared with a corresponding value of the threshold table one to one, and the result of this comparison produces binary data of "1" or "0".

In case of a matrix table of $8 \times 8$ generally thresholds of 0, 1, 2, ... 62 and 63 are arranged in 64 pixel positions, respectively. The sequence of arrangement of the thresholds, i.e., the type of patterns, is divided into a dot concentration pattern and a dot dispersion pattern. FIG. 4c shows a typical dot dispersion pattern which is generally called as a BAYER type. FIG. 4e shows a typical dot concentration pattern which is generally called as a spiral pattern. Description will now be made by assuming one example. FIG. 4a shows some original image corresponding to a pixel region of $8 \times 8$. In this figure, the hatched section has the density of 44 and the remaining section has the density of 14. In other words, the figure represents a section in which the density is abruptly changes across an inclined edge. FIG. 4b shows density data for each of pixels read from the original image of FIG. 4a.

FIG. 4d shows the result of processing the density data of FIG. 4b based on the dither method using the dot dispersion pattern of FIG. 4f shows the result of processing the same density data based on the dither method using the dot concentration pattern of FIG. 4e, and FIG. 4g shows the result of processing the same data based on the density pattern method using the dot concentration pattern of FIG. 4e. The hatched pixels indicate data of "1" (recording pixel), while the remaining pixels indicate data of "0" (non recording pixel).

Referring to those results of processing, it will be found that although no substantial error exists in any of the results in relation to the gradation, there hardly appears information indicating specific characteristics of the input data except for the average gradation in the matrix of $8 \times 8$. Information on the edge of the input image barely appears in the result of dither processing using the dot dispersion pattern (FIG. 4d).

Stated otherwise, when the area gradation processing is carried out in units of $(n \times n)$ matrix, the resolution reduces down to $1/n$ as compared with the case where the gradation processing is carried out in units of one dot. In case of such images as photographs, for example, the recording quality can obtain high evaluation even with low resolution, if the halftone, i.e., the density of each pixel is represented accurately. In case of line drawings or characters, however, the reduced resolution immediately leads to a reduction quality.

Generally, images including line drawings or characters give a monochrome representation and do not require a gradation representation in many instances. It has been, therefore, proposed to switch the image information processing for selection of either one of binary processing and gradation processing in accordance with the content of image to be handled. But, when handling multicolor images, for example, pixel information of characters or line drawings requires to be handling as halftone data in order to reproduce various different colors. Also, in monochrome recording, it is sometimes desired to represent the characters or line drawings in halftone such as gray.

SUMMARY OF THE INVENTION

It is an object of the invention to improve the resolution of images which are subjected to a gradation representation using the area gradation method.

To achieve the above object, the invention improves the resolution in each of unit regions for gradation processing which unit region comprises a plurality of pixels. To realize such improvement, in accordance with the invention, edge information is sampled from input data and allocated to output data with priority, and recording pixel data and non recording pixel data are then allocated alternately to pixel positions in the remaining region of the output data dependent on the ratio of the number of pixels contained in the remaining region to the value resulted by subtracting a value corresponding to the edge information from an average gradation value of the input data.

With the above scheme, the edge information of the input data is reflected in the processed result with priority, and recording data (e.g., 1) and non recording data (e.g., 0) are allocated to the region including no edge information so that the average gradation of the input data coincides with the gradation of the processed result. It is thus ensured that the processed result includes the information indicating a specific feature of the input data other than the average gradation thereof. Furthermore, the average gradations of both the input data and the processed result also remain unchanged.

Other objects and features of the invention will be apparent from the following explanation of an embodiment with reference to the accompanying drawings.

BRIEF DESCRIPTION OF THE DRAWINGS

FIG. 4a is a plan view showing an example of a partial region of the original document image corresponding to a unit region for gradation processing;

FIG. 4b is a plan view showing multivalue data obtained by reading the image of FIG. 4a in a two dimensionally developed from;

FIGS. 4c and 4e are plan views showing the contents of two types of threshold tables, which are used in the gradation processing, in a two dimensionally developed from;

FIGS. 4d and 4f are plan views showing the result of dither processing the data of FIG. 4b by the use of threshold data of FIG. 4c and 4e, respectively, in a two dimensionally developed from;

FIG. 4g is a plan view showing the result of subjecting the data of FIG. 4b to the density pattern processing in a two dimensionally developed from;

FIGS. 5b and 5c are plan views showing the result of subjecting the data of FIG. 4b to edge sampling processing and edge enhancement processing, respectively; and FIGS. 5d, 5e and 5f are plan views showing matrix data of 8×8 during the processing of the gradation processing circuit.

DESCRIPTION OF PREFERRED EMBODIMENT

Hereinafter, a preferred embodiment of the invention will be described with reference to the drawings.

Figure 1:
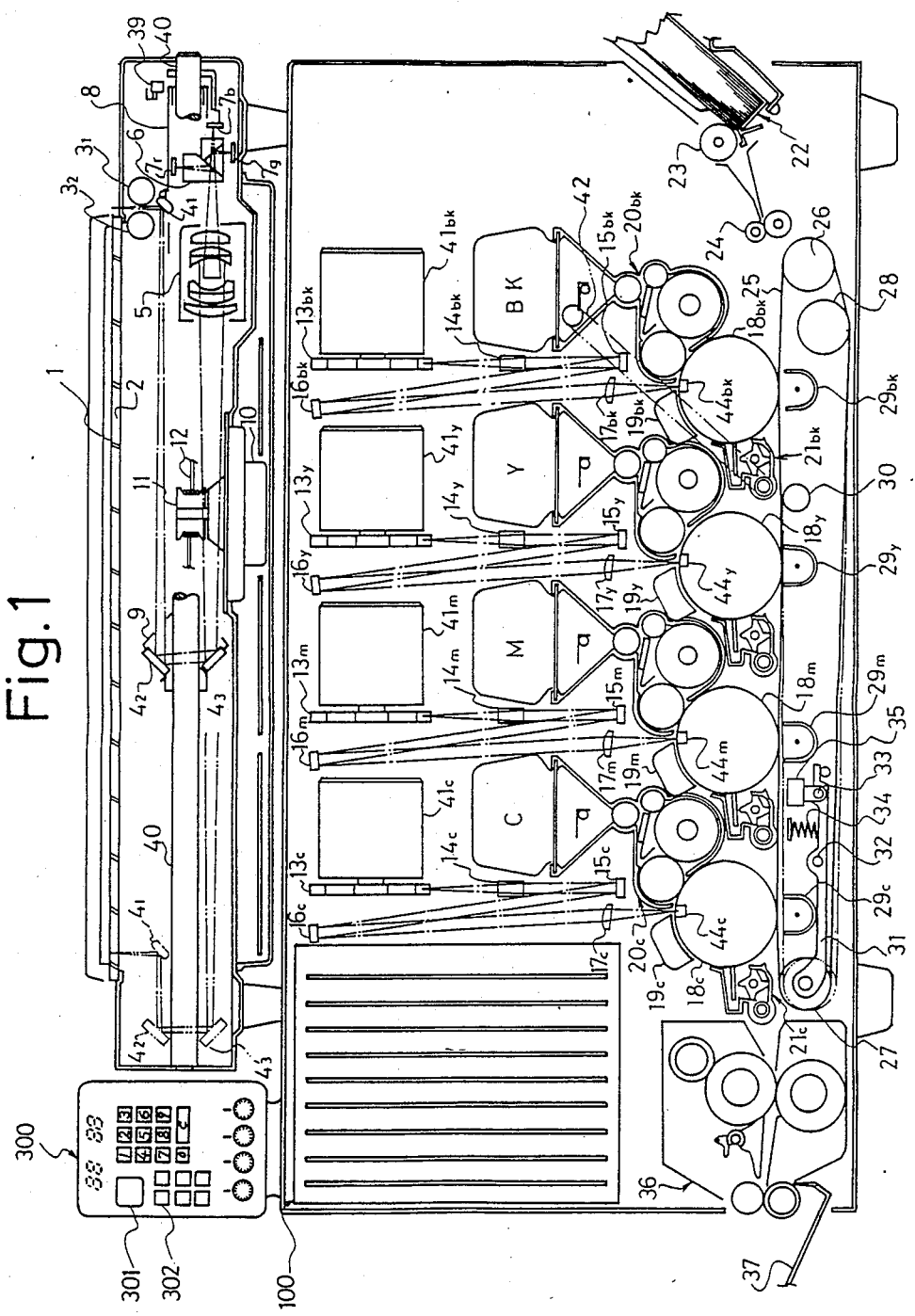
FIG. 1 is front view showing a mechanism of a digital color reproduction machine of one type in which the invention is embodied.
Figure 2:
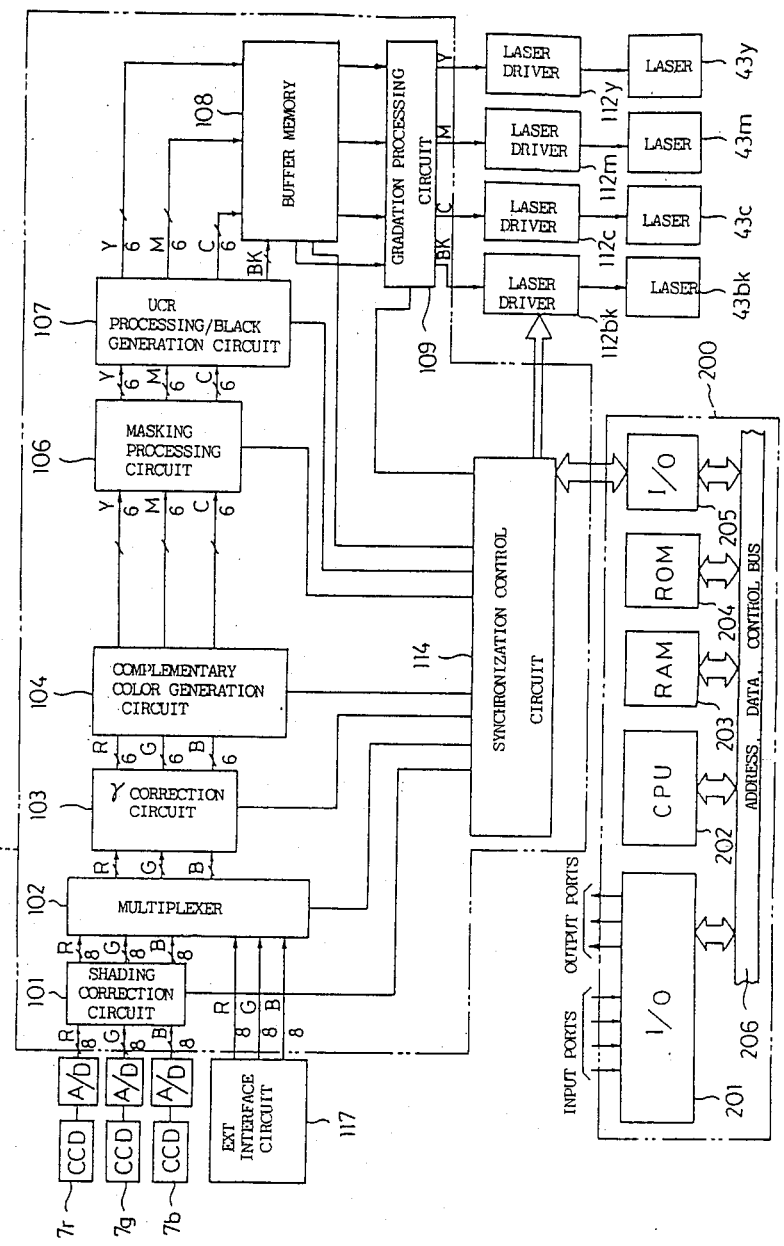
FIG. 2 is a block diagram showing an electrical circuit on the machine show in FIG. 1.

FIG. 1 shows components of the mechanism of a digital color reproduction machine of one type in which the invention is embodied, and FIG. 2 shows a general constitution of the electrical installation thereof.

Referring first to FIG. 1, a document 1 is placed on a platen (contact glass) 2 and illuminated by beams of light emitted from a pair of fluorescent lamps $3_1$ and $3_2$ for illuminating the document. The reflected light is further reflected by a first mirror $4_1$, a second mirror $4_2$ and a third mirror $4_3$, all of which are movable in the predetermined positional relationship, and then enters through a focusing lens 5 into a dichroic prism 6 where it is divided into three beams of light having different wavelengths; red (R), green (G) and blue (B). The dividend beams of light impinge on solid image pickup elements CCD's 7r, 7g and 7b, respectively. Thus, the red beam enters CCD 7r, the green beam CCD 7g, and the blue beam CCD 7d.

The fluorescent lamps $3_1$, $3_2$ and the first mirror $4_1$ are mounted on a first carriage 8, and the second and third mirrors $4_2$, $4_3$ are mounted on a second carriage 9. The second carriage 9 is moved at a half speed of the first carriage 8, so that an optical length from the document to each of CCD's is held constant. When reading the original image, the first and second carriages are both scanned from the right to the left. A carriage drive wire 12 wound round a carriage drive pulley 11, which is secured to a shaft of a carriage drive motor 10, is connected to the first carriage 8 on one hand, and wound round a mobile pulley (not shown) of the second carriage 9 on the other hand. With this arrangement, as the motor 10 is rotationally driven forward and backward, both the first and second carriages 8, 9 are moved forward (for scan of reading the original image) and backward (for return) correspondingly, with the second carriage 9 running at a half speed of the first carriage 8.

When the first carriage 8 is at a home position as shown in FIG. 1, the presence of the first carriage 8 is detected by a home position sensor 39 comprising a photo sensor of reflection type. When the first carriage 8 is driven to the left out of its home position for the purpose of exposure scan, the sensor 39 comes into a state of receiving no beam of light (non detection of the carriage), and when the first carriage 8 is moved back to its home position for return, the sensor 39 comes into a state of receiving a beam of light (detection of the carriage). Upon changing of the sensor state from one of receiving no beam of light to the other of receiving a beam of light, the carriage 8 is caused to stop.

Referring now to FIG. 2, outputs of CCD's 7r, 7g and 7b are subjected to analog/digital conversion and then to the necessary processing through an image processing unit 100 so that they are converted to binary signals for effecting the recording process of respective recording color information of black (BK), Yellow (Y), magenta (M) and cyan (C). These binary signals are input to laser drivers 112bk, 112y, 112m and 112c for energizing semiconductor lasers 43bk, 43y, 43m and 43c, respectively, to thereby emit laser beams which are modulated by the corresponding recording color signals (binary signals).

Referring again back to FIG. 1, the emitted laser beams are reflected by rotatable polygon mirrors 13bk, 13y, 13m and 13c and then pass through f-θ lenses 14bk, 14y, 14m and 14c, respectively. After being reflected by fourth mirrors 15bk, 15y, 15m and 15c and fifth mirrors 16bk, 16y, 16m and 16c, those laser beams are focused through cylindrical lenses 17bk, 17y, 17m and 17c for correcting titled images caused by the polygon mirrors to irradiate photosensitive drums 18bk, 18y, 18m and 18c, respectively.

The rotatable polygon mirrors 13bk, 13y, 13m and 13c are secured to rotatable shafts of the polygon mirror drive motors 14bk, 14y, 14m and 14c, respectively, each of the motors being rotated at a constant speed to rotationally drive the associated polygon mirror. Rotation of the polygon mirror causes the laser beam to be scanned in a direction perpendicular to the rotational direction of the photosensitive drum (clockwise direction), i.e., in a direction along the drum shaft.

The surfaces of the respective photosensitive drums are uniformly charged by charging corotorons 19bk, 19y, 19m and 19c respectively connected to corresponding high negative voltage generators. When the laser beams modulated by the recording signals are irradiated onto the uniformly charged surfaces of the photosensitive drums, the charges on those surfaces are discharged through machine grounds of the drum bodies due to a photoconductive phenomenon. At this time, the lasers are not energized for dark sections of the document density and energized for light sections thereof. As a result, those parts of the surfaces of the photosensitive drums 18bk, 18y, 18m and 18c which correspond to the dark sections of the document density become the potential in order of −800 v, and those parts thereof which correspond to the light sections of the document density become the potential in order of −100 v, whereby electrostatic latent image are formed depended on the tone of the document. These electrostatic latent images are developed by a black development unit 20bk, yellow development unit 20y, magenta development unit 20m and a cyan development unit 20c so as to from black, yellow, magenta and cyan toner images on the surfaces of the photosensitive drums 18bk, 18y, 18m and 18c, respectively.

Incidentally, toner in each of the development units is charged to be positive by continuous agitation and the development unit is biased to about −200 v by a development bias generator (non shown). The toner adheres onto those areas in which the surface potential of the photosensitive drum is equal to or higher than the development bias, with the result that the toner images are formed which correspond to the original image on the document.

On the other hand, a sheet of recording paper 267 accommodated in a transfer paper cassette 22 is forwarded by the feeding operation of a feed roller 23 and then sent onto a transfer belt 25 by means of a resist roller 24 in the predetermined timing. After being placed on the transfer belt 25, the recoring paper is moves to sequentially pass under the photosensitive drums 18bk, 18y, 18m and 18c with the movement of the transfer belt 25, so that black, yellow, magenta and cyan toner images are sequentially transferred onto the recording paper under the action of transfer corotorons 29bk, 29y, 29m 29c located all below the transfer belt 25, while the recording paper is moved to pass the photosensitive drums 18bk, 18y, 18m and 18c in this order. After transfer, the recording paper is sent to a heat fusing unit 36 where the toner is fused onto the recording paper, and then discharged into q tray 37.

The transfer belt 25 for sending the recording paper in the direction from the photosensitive drum 18bk toward 18c is stretched over an idle roller 26, drive roller 27, idle roller 28 and an idle roller 30, the drive roller 27 being adapted to rotationally drive the transfer belt 25 in the counterclockwise direction. The drive roller 27 is journalled to the left end of a lever 31 which is in turn pivoted to a shaft 32. To the right end of the lever 31 is journalled a plunger 35 for a black mode setting solenoid (not shown). A compression coiled spring 34 is disposed between the plunger 35 and the shaft 32 for giving the lever 31 with rotational forces in the clockwise direction.

Reference is now made to FIG. 2. An image processing unit 100 converts three color image signals read by CCD's 7r, 7g and 7b to four recording signals of black (BK), yellow (Y), magenta (M) and cyan (C) necessary for the receiving, and then stored those recording signals in a buffer memory 108. Thereafter, the unit 100 further converts 6-bit data of a 64-level representation to a binaryy signal of an area gradation representation for each color through a gradation processing circuit 109, and then applies the resulting binary signals to the lasers 43y, 43m, 43c and 43k through the laser drivers 112y, 112m, 112c and 112bk, respectively.

It is to be noted that, while three color signals are applied to the image processing unit 100 from CCD's 7r, 7g and 7b in a reproduction machine mode as mentioned above, another set of three signals are applied to the unit 100 from the exterior of the reproduction machine through an external interface circuit 117 in a graphics mode.

A shading correction circuit 101 in the image processing unit 100 corrects color gradation data, each of which is obtained by A/D converting the output signal from each of CCD's 7r, 7g and 7b to 8-bit data, for optical variations in the luminous intensity, electric variations in the sensitivity of internal unit elements of CCD's 7r, 7g and 7b, etc. to thereby establish read-out color gradation data.

A multiplexer 102 serves to selectively output either one of two sets of output gradation data from the correction circuit 101 and the external interface circuit 117.

A γ correction circuit 103 receiving the output of the multiplexer (color gradation data) serves to modify the gradation property (input gradation data) in response to particular characteristics of the photosensitive drums, change the gradation property in an arbitrary manner upon actuation of operation buttons on a console 300, as well as to convert the input 8-bit data to output 6-bit data. One output of 6-bit data corresponds to an output of data indicating one set of 64 gradation. Three color gradation data output from the γ correction circuit 103 are applied to a complementary color generation circuit 104, those data each comprising 6 bits and indicating the gradation of red (R), green (G) and blue (B), respectively.

The generation of complementary colors means renaming of the read-out color signals to the recording color signals correspondingly. More specifically, the red (R), green (G) and blue (B) gradation data are converted (or renamed) to cyan (C), magenta (M) and yellow (Y) gradation data, respectively.

The respective data of Y, M and C outputs from the complementary color generation circuit 104 are applied to a masking processing circuit 106.

The masking processing and UCR processing will now be described. An arithmetic equation of the masking processing is generally given by:

$$\begin{pmatrix} Yo \\ Mo \\ Co \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Yi \\ Mi \\ Ci \end{pmatrix}$$

where Yi, Mi and Ci are pre-masking data and Yo, Mo and Co are post-masking data.

Also, the UCR processing can be represented by the following general equation:

$$\begin{pmatrix} Yo' \\ Mo' \\ Co' \\ BKo' \end{pmatrix} = \begin{pmatrix} a_{11}' & a_{12}' & a_{13}' \\ a_{21}' & a_{22}' & a_{23}' \\ a_{31}' & a_{32}' & a_{33}' \\ a_{41}' & a_{42}' & a_{43}' \end{pmatrix} \begin{pmatrix} Yo \\ Mo \\ Co \end{pmatrix}$$

Accordingly, in this embodiment, a matrix of new coefficients is determined by multiplying two matrices of coefficients in the above equations follows:

$$\begin{pmatrix} Yo' \\ Mo' \\ Co' \\ BKo' \end{pmatrix} = \begin{pmatrix} a_{11}' & a_{12}' & a_{13}' \\ a_{21}' & a_{22}' & a_{23}' \\ a_{31}' & a_{32}' & a_{33}' \\ a_{41}' & a_{42}' & a_{43}' \end{pmatrix} \begin{pmatrix} a_{11} & a_{12} & a_{13} \\ a_{21} & a_{22} & a_{23} \\ a_{31} & a_{32} & a_{33} \end{pmatrix} \begin{pmatrix} Yi \\ Mi \\ Ci \end{pmatrix} =$$

-continued $$\begin{pmatrix} a_{11}'' & a_{12}'' & a_{13}'' \\ a_{21}'' & a_{22}'' & a_{23}'' \\ a_{31}'' & a_{32}'' & a_{33}'' \\ a_{41}'' & a_{42}'' & a_{43}'' \end{pmatrix} \begin{pmatrix} Y_i \\ M_i \\ C_i \end{pmatrix}$$

The individual coefficients ($a_{11}$, etc.) in the above arithmetic equation used for carrying out both the masking processing and the UCR/black generation processing concurrently are calculated in advance and substituted into the above arithmetic equation, so that respective arithmetic values (Yo', etc.: outputs of the UCR processing circuit 107) correspondent to the predicted inputs Yi, Mi and Ci (each comprising 6 bits) of the masking processing circuit 106 are memorized in ROM beforehand. In this embodiment, therefore, the masking processing circuit 106 and the UCR processing/black generation circuit 107 are constituted by one set of ROM such that those data, which are stored in the addresses specified by the inputs Y, M and C to the masking processing circuit 106, are applied as outputs from the UCR processing/black generation circuit 107 to the buffer memory 108 and the gradation processing 109. By the way, generally speaking processing circuit 106 serves to correct the Y, M and C signals in particular characteristics of spectroscopic reflection wavelengths of toner forming the recording images, and the UCR processing circuit serves to correct the color balance in superposition of toner for respective colors. While passing through the UCR processing/black generation circuit 107, the data of black component BK is produced as a result of synthesis of the three color input data of Y, M and C and the output data of respective colors Y, M and corrected to the valued which are resulted by subtracting the black component from the input data.

The gradation processing circuit 109 in the image processing unit 100 will now be described. The circuit 109 functions to convert each of the multivalue input data of Y, M and C to binary data, and it carries out the area gradation processing in order to reflect the gradation property of the input data into the output data.

In this embodiment, the gradation processing circuit 109 comprises a microcomputer owing to the complicated gradation processing, so that the date is processed in accordance with the software processing executed by the microcomputer. Because the gradation processing requires a longer period of time than the reading of images, all the data (Y, M, C) of the read-out image are once stored in the buffer memory 108. The gradation processing is performed on the data stored in the buffer memory 108.

Though not shown, the gradation processing circuit 109 comprises a microprocessor, random access memory, read only memory, etc. like a typical microcomputer. Operation of the gradation processing circuit 109 is programmed beforehand in the from of data in the read only memory.

The gradation data of 6 bits can represent density information of 64 gradations. Ideally, a diameter of each dot would be variable over 64 stages to provide such density information without degrading the resolution. In practice, however, modulation of the dot diameter can offer stable gradation only in order of four staged at maximum in a laser beam electrophotographic system. From this reason, there is usually adopted the area gradation method singularly or a combination of the area gradation method and the beam modulation in many cases. Herein, the area gradation processing is carried out for each pixel of 8×8 to provide a halftone representation of 64 gradations.

The gradation processing circuit 109 is designed to process four color component data of Y, M, C and BK separately, but those data are processed in the substantially same manner. Operation of the gradation processing circuit 109 required for processing the data of one color component is shown in FIGS. 3a, 3b, 3c and 3d.

The operation of the gradation processing circuit 109 will be described hereinafter by referring to those figures. Prior to entering the detailed explanation, the principles of the operation will first be described.

Figure 4G:
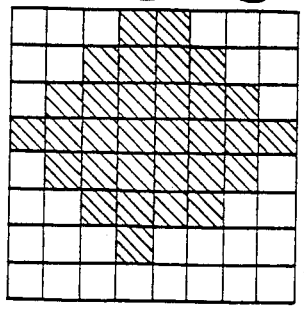

In the image shown in FIG. 4a, for example, the image density is largely changed across an edge obliquely intersecting the pixel matrix of 8×9. In this case, the preferable processing result, i.e., the resulting binary image with high resolution and superior gradation property, can be obtained by sufficiently reflecting the presence or absence of the edge, information on the position thereof, as well as information on the average densities of two regions divided by the edge, into the processed data.

Figure 5A:
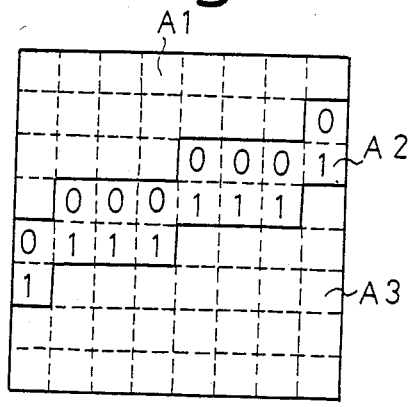
FIG. 5a is a plan view showing an example of division of the region applied to the data of FIG. 4b.

To this end, it is first needed to reflect the edge information into the processed result with priority. In other words, this just requires to allocate the data of "1" and "0" on the both sides of the edge as shown in FIG. 5a. The data (8×8 matrix) shown in FIG. 4b has the average gradation value of 31.5.

The average gradation (the number of "1") of the processed result can be made equal to the input data by allocating 32 (or 31) data of "1" into the processed result of 8×8 matrix. To handle the edge information with priority herein, the data in an edge region a2 shown in FIG. 5a is kept intact. Because the edge region a2 includes 8 data of "1", the number of remaining "1" data is equal to 24 which are to be allocated into the processed result. Thus, those 24 data of "1" must be allocated to both regions A1 and A3. For reflecting the specific feature of the input data into the processed data, it is effective to distribute 24 data of "1" in accordance with both the average density of the input data and the number of pixels in each of the separate regions. In case of the data shown in FIG. 4b, for example, 5 data of "1" and 19 data of "1" are allocated to the remaining separate regions A1 and A3 shown in FIG. 5a, respectively.

The operation of the gradation processing circuit 109 will now be described with reference to FIGS. 3a, 3b, 3c and 3d.

Figure 3A:
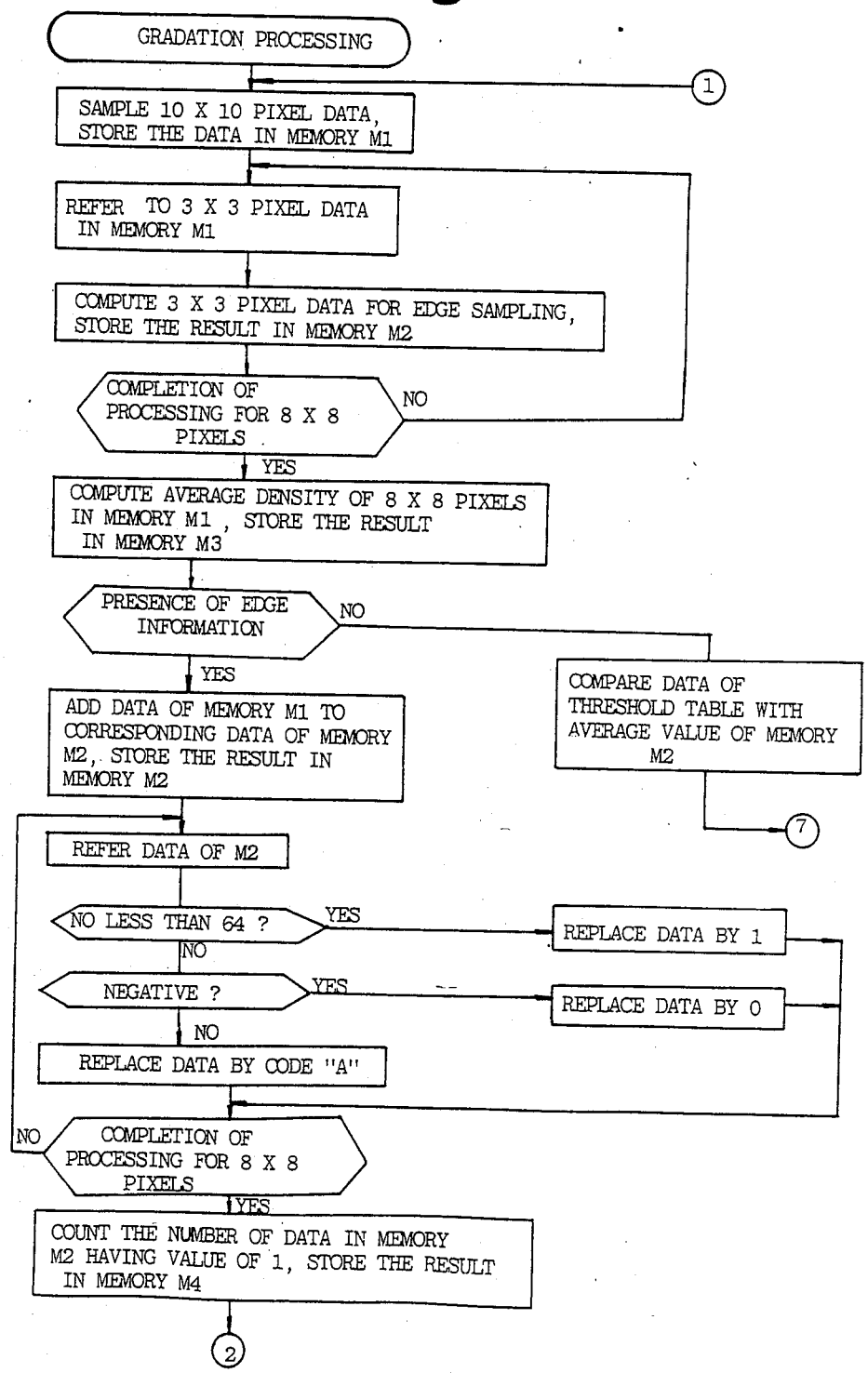
FIGS. 3a, 3b, 3c and 3d are flowcharts showing the operation of a gradation processing circuit 109 in FIG. 2.

Reference is first made to FIG. 3a. Initially, the data corresponding to a pixel region of 10×10 is sampled out of the data in the buffer memory 108 and then stored into a memory M1 inside the gradation processing circuit. It is to be noted that, although a pixel matrix of 8×8 is handled as one processing unit in the gradation processing of this embodiment, a matrix of 10×10 including the data located outwardly of a central matrix of 8×8 by one pixel on the above, under, left and right sides thereof is sampled because the data outside the matrix of 8×8 are required in edge sampling described later.

The sampled matrix region of 10×10 is successively shifted 8 pixels by 8 pixels in the direction of main scan, every when each sampled region has been completely processed. Upon reaching the end position in the direction of main scan, the sampled matrix region is shifted by 8 pixels in the direction of subscan and the similar process is repeated again in the direction of main scan. In a like manner, both main scan and subscan are repeated properly so as to process all the data in the buffer memory 108 completely.

The sampled matrix data of 10×10 are each processed as follows. First, the edge sampling process is carried out. In this embodiment, assuming a matrix of 3×3, i.e., one pixel of interest and eight pixels surrounding the same, the total sum of the results of computing the data at nine pixel positions of the assumed matrix by making use of the corresponding coefficients is taken as the processed result of the pixel of interest. This process is successively repeated with a pixel of interest being shifted from one pixel to another pixel throughout the matrix of 8×8. Thus, when the pixel of interest is positioned at the data locating in the top and bottom rows as well as the leftmost and rightmost columns of the matrix of 8×8, reference must be made to also the data outside the matrix of 8×8.

When carrying out the edge sampling process, there are possible various coefficients to be allocated to the respective pixels. In this embodiment, the numerical value of 12 is allocated to the pixel of interest, the numerical value of −2 to each of four pixel in upper, lower, left and right positions in the aforesaid matrix of 3×3, and the numerical value of −1 to each of remaining four pixels in upper left, upper right, lower left and lower right positions in the matrix of 3×3.

More specifically, letting the pixels in upper left, upper, upper right, left, central, right, lower left, lower and lower right positions to be designated at symbols of A, B, C, D, E, F, G, H and I, respectively, the result of edge sampling E' is given by:

$$E' = 12 \cdot E - 2(B+D+F+H) - (A+C+G+I) \quad (1)$$

FIG. 5b shows the result of subjecting the data shown in FIG. 4b to the edge sampling process in accordance with the above equation. In order to the result of gradation processing in the from of binary data, the values resulted from such edge sampling process are each compared with a fixed threshold of 32, so that the data of "1" is given to the values equal to or larger than 32 and the data of "0" is given to the remaining values. The processed results thus obtained are stored in the corresponding pixel locations of a memory M2. The above edge sampling process will be repeated until all the data of 8×8 are completely processed.

Next, the average density (gradation) of 8×8 matrix among the data stored in the memory M1 is computed. Stated otherwise, the total sum of respective values of 64 pixels is calculated and the 1/64 value of the total sum is obtained. The resulting value is then stored in a memory M3.

Thereafter, reference is made to the data in the memory M2 for checking the presence or absence of edge in the input data. This check is made by judging whether or not the data of "1" is present in the results of edge sampling and conversion to the binary data. Namely, if the data of 8×8 pixels in the memory M2 includes even one "1", this is judged as the presence of edge.

When the input data includes no edge information, it simplifies the processing and provideds the most superior gradation property and, therefore, the density pattern method is used to carry out the area gradation processing. This case will be described later.

When the input data includes edge information, the edge enhancement process is performed subsequently. The edge enhancement process is similar to the foregoing edge sampling process in basic nature, but the values of coefficients applied to the respective pixels are different therebetween. In this embodiment, assuming a matrix of 3×3 for each of pixels in a like manner to the edge sampling, the numerical value of 13 is allocated to the pixel of interest, the numerical value of −2 to four pixels in upper, lower, left and right positions in the matrix of 3×3, and the numerical value of −1 to the remaining four pixels in upper left, upper right, lower left and lower right positions of the matrix of 3×3. The total sum of processed results for all the pixels is taken as the result of edge enhancement for the pixel of interest.

More specifically, letting the pixels in upper left, upper, upper right, left, central, right, lower left, lower and lower right positions to be designated at symbols of A, B, C, D, E, F, G, H and I, respectively, the result of edge enhancement E" is given by:

$$E'' = 13 \cdot E - 2(B+D+F+H) - (A+C+G+I) \quad (2)$$

By substituting the above mentioned equation (1), the equation (2) can be rewritten as follows:

$$E'' = E' + E \quad (3)$$

That is, the result of edge enhancement process can simply be obtained by adding the data prior to the edge sampling process, i.e., input data, to the result of edge sampling. Therefore, the pixel data in the memory M1 are added to the pixel data in the memory M2 in one to one correspondence manner, and the resulting data are stored in the memory M2. The data in the memory M2 is thus updated to reflect the edge enhancement of the input data.

FIG. 5c shows the result of subjecting the data of FIG. 4b the edge enhancement process.

Next, edge information is produced by referring to the pixel data in the memory M2 after the edge enhancement. If the data have a value equal to or larger than 64, i.e., greater than maximum value prior to the edge enhancement (6 bits: 63), such data are each replaced by "1". If the data have a negative value, i.e., it is smaller than the minimum value prior to the edge enhancement (0), such data are each replaced by "0". Those pixel data which have a value other than the above ones, i.e., within a range of 0 to 63, are each replaced by a code "A" for identity (where "A" is a predetermined code except for 0 and 1). This processing is carried out for each pixel of the 8×8 matrix.

FIG. 5d shows the result of subjecting the data after the edge enhancement shown in FIG. 5c to the above processing.

Then, the number of only such pixels as having the data of "1" is counted by referring to the data in the memory M2 stored after the above processing, and the resulting value is stored in a memory M4. In other words, the value stored in the memory M4 represents the number of recording pixels "1" in the edge region (A2 of FIG. 5a). In FIG. 5d, that value is equal to 12.

Figure 3B:
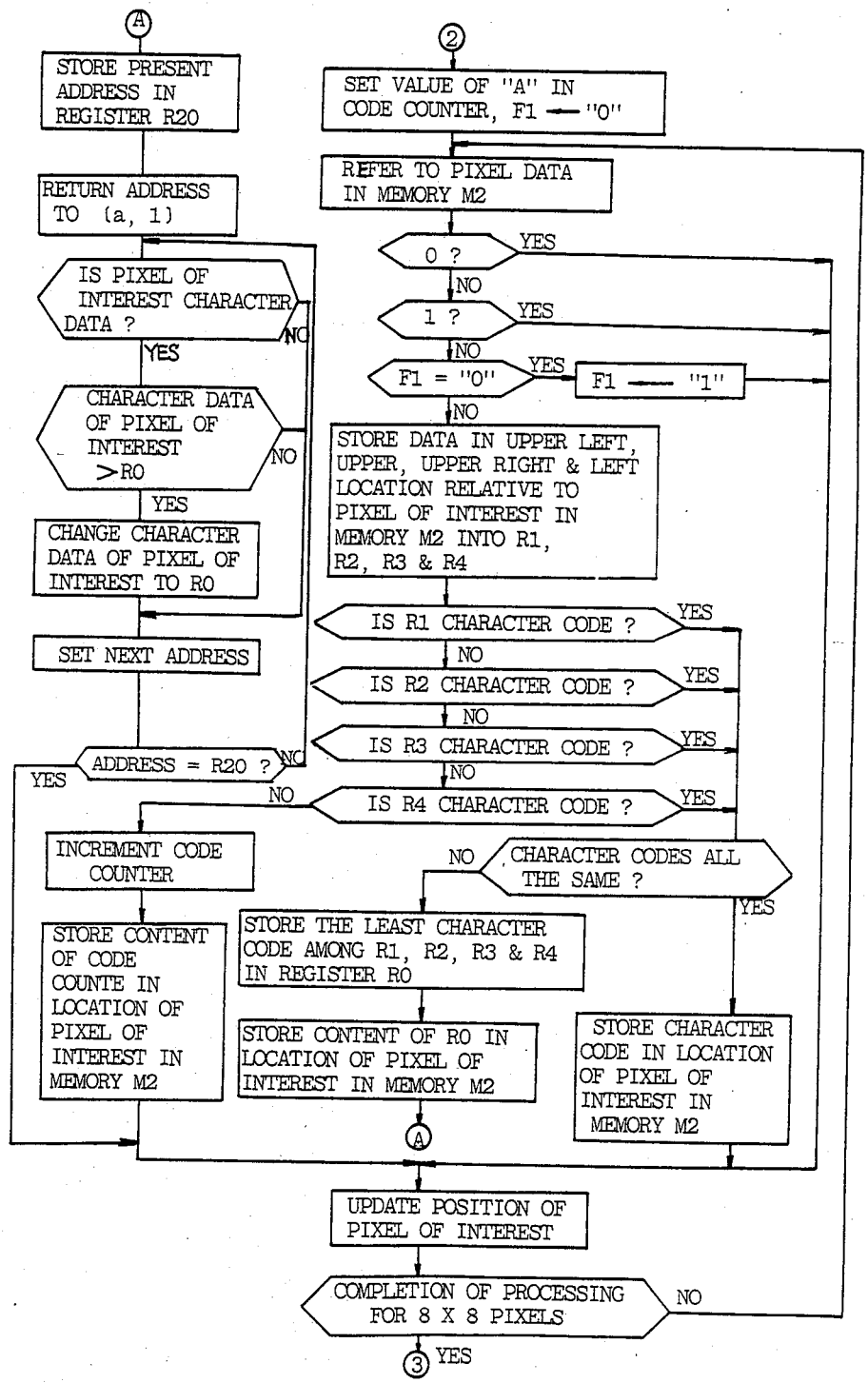

Description will be continued by referring TO FIG. 3b. To put it briefly, in the processing shown in FIG. 3b, it is judged whether or not a group of pixels designated at the code "A" as a result of the foregoing process can be divided by the edge information. If so, those pixels are given with different identity codes for each of the divided regions.

First, the value of "A" is initially set in a code counter and a flag is set to "0". The processing is carried out by referring to the pixel data in the memory M2 as follows.

If the data is equal to "0" or "1", the pixel of interest is shifted to the next pixel without doing any processing. Herein, the pixel of interest is shifted from the left to the right and from above to below with scans in the horizontal and vertical directions being referred to as main scan and subscan, respectively. Also, if the flag F1 has a sitting value of "0" when there appears data except for "0" and "1", this means the first "A". Thus, the flag F1 is simply set to "1" and the pixel of interest is then shifted to the next pixel.

In another case, the following occurs. First, the data in upper left, upper, upper right and left locations relative to the pixel of interest in the memory M2 are stored in registers R1, R2, R3 and R4, respectively. Stated otherwise, the registers R1, R2, R3 and R4 load therein the data of those pixels which are adjacent the pixel of interest and have already scanned. When the pixel of interest is at a pixel position [a,1] (see FIG. 5e) from which scan is started the registers R1 to R4 load therein the value of 9. In this case, the code counter is incremented by one and the resulting value is stored in a location corresponding to the pixel of interest in the memory M2. In this embodiment, the code "A" is thus in the location of the pixel of interest.

Everywhen the separation of the regions is detected based on the edge information, the code counter is incremented by the one and its content is successively updated to different character codes such as "A", "B", "C", "D" .... Incidentally, there is the relationship of "A"<"B"<"C" ... between the respective codes.

For any contents of the registers R1, R2, R3 and R4 given with character codes (values except for 0 and 1), if those character codes are all the same, that character code is stored in the location of the pixel of interest. In case of the pixel of interest being at a position b, 2 in FIG. 5d, for example, the character code "A" of the pixel on the left side relative to the pixel of interest is stored in the location of that pixel of interest.

When a plurality of different character codes are present, the last value among those codes is stored in the register R0. Then, the content of R0 is stored in the location of the pixel of interest and also in those locations where the character codes are present among the respective locations of those character data, which have the codes larger than the content of R0, out of all the character data of 8×8 matrix up to the pixel of interest in the memory M2 (i.e., from [a, 1] to the pixel of interest). In case of processing the data of FIG. 5d, for example, at the time when the pixel of interest reaches a position [e, 6] in the 8×8 matrix, there exist the codes "C" and "D" in an upper right location [f, 5] and a left location [d, 6] relative to the pixel of interest, respectively. Therefore, the code "C" having a lesser value is stored in the location of the pixel of interest and the data in the left location [d, 6] is updated to the code "C". At the same time, the content of the code counter is returned back to the value of "C".

As a result of processing all the pixels in the 8×8 matrix in such a manner as mentioned above, the data of FIG. 5d is converted to FIG. 5e by way of example. In this example, as will be seen from FIG. 5e, the region of 8×8 matrix excepting for the edge region is divided into a region of the code "A", a region of the "B" and a region of the code "C". It should be also understood that at the completion of the above processing the content of the code counter coincided with "C".

Description will be described with reference to FIG. 3c. The processing of FIG. 3c mainly consists of determining the distribution ratio of data "1" among the divided regions. First, the value of the code counter is stored in a register R5 and the value of the code "A" is set in a register N. Further, later described registers R6 AND R7) each comprising a plurality of registers in number corresponding to that of the divided regions) are cleared. The processing is carried out by referring to the data in the memory M2 (FIG. 5e) as follows. The referred data is compared with the content of the register N. If both the values are equal to each other, the content of the register R6(N) associated with the value of the register N is incremented by one and the value of data in the memory M1 corresponding to the position of the present pixel of interest is added to the register R7(N) associated with the value of the register N. The position of the pixel of interest is then updated so that all the pixels of 8×8 are processed in a like manner. After completion of the above processing, the value of the register N is incemented by one and the similar processing is repeated once again. If the value of the register N becomes larger than the value of the register R5, the program processeds to the next processing.

In other words, for the value of the register N given with the code "A", the number of pixels having the code "A" is counted by the register R6(N) and the total sum of those input data (FIG. 4b) in the region designated at the code "A" is stored in the register R7(N). Likewise, the data of code "B" is processed for the value of the register N given with the code "B", and the data of code "C" is processed for the value of the register N given with the code "C".

Next, the following processing is carried out by initially setting the code "A" in the register N once again.

The content of the register R7(N) is transferred to a register R8(N) and the value of N is incremented by one. This process will be repeated until the incremented result exceeds the value of the register R5. Herein, the data loaded in the register R8(N) corresponds to the value resulted by multiplying the average density of each of the regions by the size of that region.

Thereafter, the following processing is further carried out by initially setting the code "A" in the register N once again.

More specifically, the value of R8(N)/ΣR8 is computed and the resulting value is stored in a register R9(N) while incrementing the value of N one. This process will be repeated until the incremented result exceeds the value of the register R5. Herein, the data loaded in the register R9(N) represents the distribution ratio of recording data "1" to be allocated to each of the regions other than the edge region.

Next, the result of subtraction the content of the memory M4 from the content of the memory M3 is loaded in a register R10. As mentioned above, the content of the memory M3 represents the average density throughout the matrix of 8×8 pixels and the content of the memory M4 represents the number of pixels of "1" in the edge region (A2 in FIG. 5a), so the register R10 loads therein the number of data "1" to be allocated to the entire region other than the edge region.

After that, the following processing is still further carried out by initially setting the code "A" in the register N once again.

More specifically, the value of R9(N)×R10 is computed and the resulting value is stored in a register R11(N). Herein, the value loaded in the register R11(N) corresponds to the number of data "1" to be allocated to each of the regions other than the edge region.

Figure 3C:
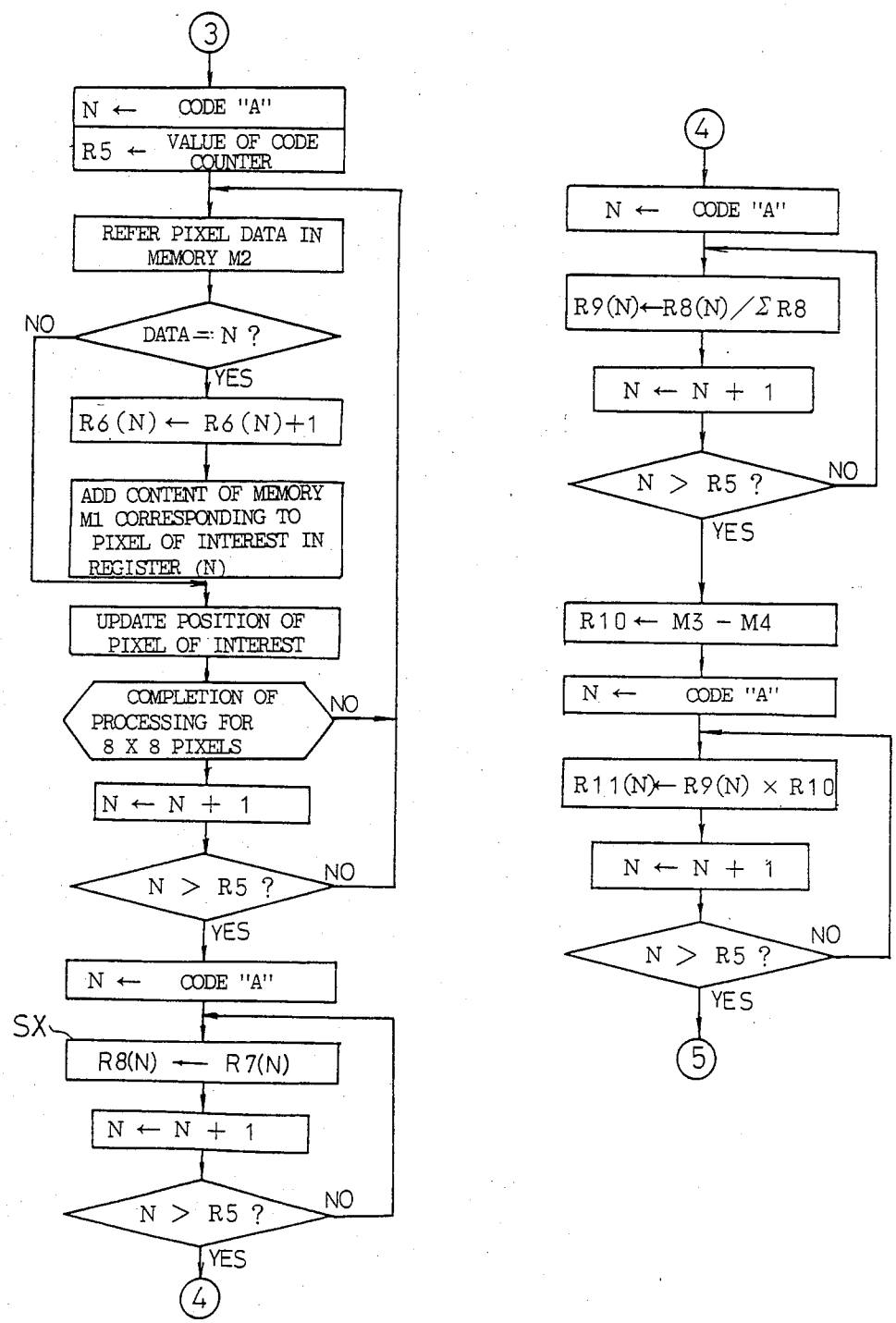

In case of processing the data shown in FIGS. 4b and 5e, the value stored in the respective registers during the above processing of FIG. 3c are given as shown in the following Table 1.

TABLE 1

| REGION A | REGION B | REGION C |
|---|---|---|
| R6(A):15 | R6(B):1 | R6(C):24 |
| R7(A):189 | R7(B):30 | R7(C):1057 |
| R8(A):189 | R8(B):30 | R8(C):1057 |
| R9(A):0.148 | R9(B):0.023 | R9(C):0.828 |
| R11(A):2.96 | R11(B):0.46 | R11(C):16.56 |

Incidentally, the content of the register R10 is equal to 20.

Rounding the contents of the registers R11(N) shown in Table 1 to nearest whole number, the values of the registers R11(A), R11(B) and R11(C) become 3, 0 and 17, respectively. It is thus understood that the data of "1" in numbers of 3, 0 and 17 should be allocated to the regions of the character codes "a", "B" and "C" in FIG. 5e, respectively.

Figure 3D:
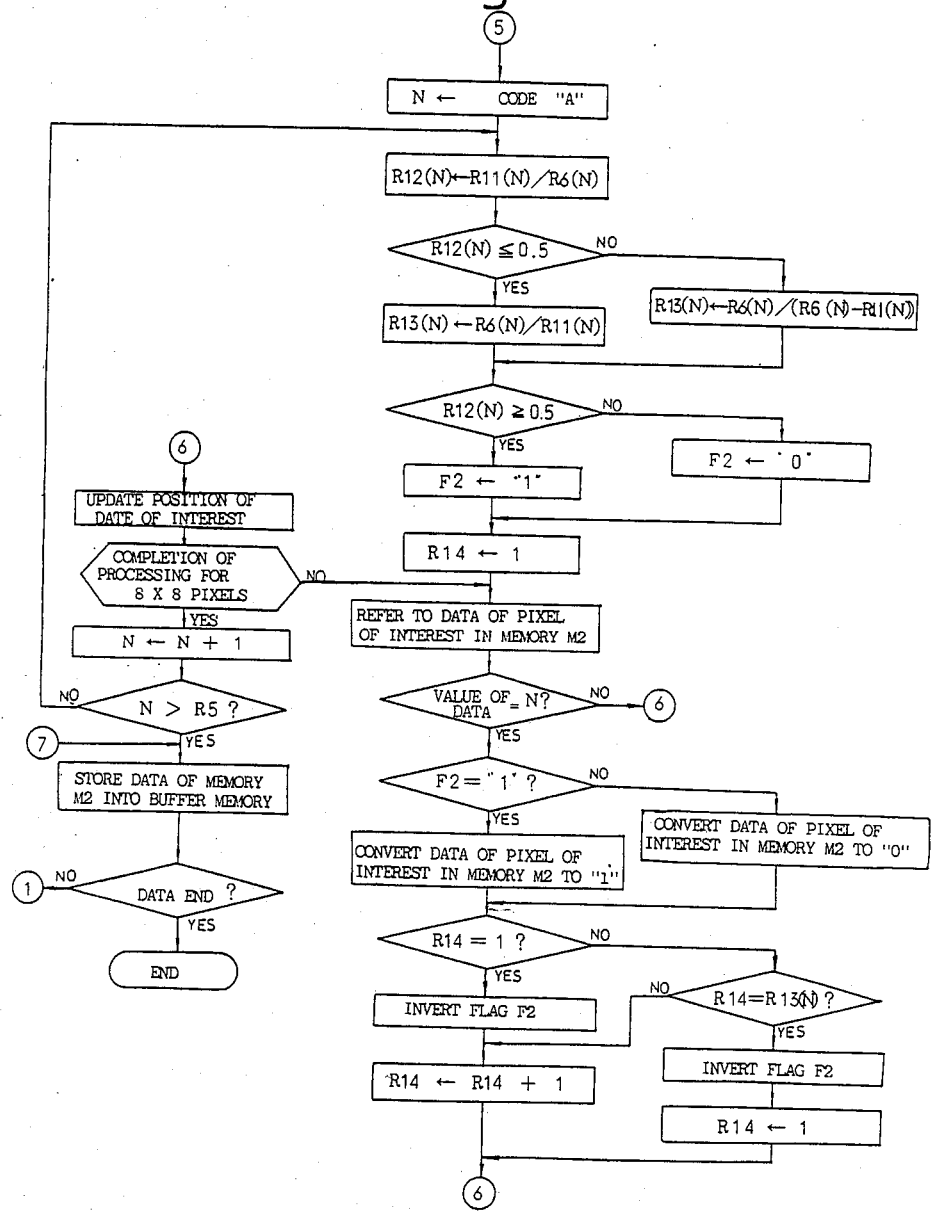

Description will be continued below with reference to FIG. 3d. To put it briefly, in the processing of FIG. 3d, the data stored in the memory M2 at locations of those pixels given with the character codes are each replaced by "1" or "0" to thereby convert the data of all pixels to those in the binary form.

First, the following processing is carried out by initially setting the value of code "A" in the register N.

The value of R11(N)/R6(N) is computed and the resulting value is stored in a register R12(N). Herein, the value stored in the register R12(N) corresponds to the ratio of those data "1" between two binary data to be replaced by the character code, which appear in each of the regions given with the character codes.

Thereafter, the content of the register R12(N) is compared with a fixed value 0.5. If the content of R12(N) is equal to or less than 0.5, the value of R6(N)/R11(N) is computed and the resulting value is stored in a register R13(N). Also, if the content of R12(N) exceeds 0.5, the value of R6(N)/(R6(N)−R11(N)) is computed and the resulting value is stored in the register R13(N).

Furthermore, if the content of the register exceeds 0.5, a flag F2 is set to "1" and, if it is equal to or less than 0.5, the flag F2 is set to "0". Then, after initially setting 1 in a register R14, all the pixels of 8×8 matrix in the memory M2 are successively processed as follows. When the data of interest coincides with the value of the register N, the flag F2 is checked. If the flag F2 is set to "1", the data of the pixel of interest in the memory M2 is replaced by "1" and, if the flag F2 is set to "0", it is replaced by "0". Further, the content of the register R14 is checked. If it is equal to 1, the flag F2 is invented in its state (from 1 to 0 or vice versa) and the content of the register R14 is incremented by one. If the content of R14 coincides with that of the register R13(N), the flag F2 is inverted in its state and the content of the register R14 is set to 1.

Specifically, if the content of the register R12(N) exceeds 0.5, the data of "1" are allocated to those pixels in the region of the corresponding character code at the first position and at every n-th positions (where n is the content of R13(N)), and the data of "0" are allocated to the remaining pixels in that region. To the contrary, if the content of the register R12(N) is equal to or less than 0.5, the data of "0" are allocated to those pixels in the region of the corresponding character code at the first position and at every n-th pixel positions, and the data "1" are allocated to the remaining pixels in that region. After all the pixels of 8×8 matrix have been scanned completely, the content of the register N is incremented by one. The above processing will be repeated until the content of the register N exceeds that of the register R5.

In case of the foregoing Table 1, the content of the respective registers are given as follows.

| R12(A):0.2, | R12(C):0.71 |
|---|---|
| R13(A):5, | R13(C):3.43 |

In this example, accordingly, for the region of the character code "A" the data of "1" are allocated every five pixels and the data of "0" are allocated to the remaining pixels, such as 1, 0, 0, 0, 0, 1, 0, 0, . . . . For the region of the character code !c", the data of "0" are allocated every three pixels and the data of "1" are allocated to the remaining pixels, such as 0, 1, 1, 0, 1, 1, 0, 1, . . . . Incidentally, the data of "0" are allocated to all the pixels in the region of the character code "B".

FIG. 5f shown the result of subjecting the data of FIG. 5e to the above processing. As will be seen from FIG. 5f, the edge information of the input data is reflected in that processed result, and the distribution ratio of "1" and "0" in each of regions divided by the edge corresponds the average density of the input data in the same region. It will be also found that the average density (gradation) of the data shown in FIG. 5f is equal to 30 which has no significant gap with respect to that of the input data.

In this manner, the data of 8×8 matrix stored in the memory M2 in the binary from are loaded into the buffer memory at predetermined locations, and the data in the buffer memory will be processed in units of 8×8 pixels until all the data are processed completely.

Meanwhile, when the absence of edge is judged as the result of edge sampling, the gradation processing is carried out using the density pattern method. More particularly, the value of the average density of 8×8 matrix stored in the memory M3 is compared with the value of each pixel in the threshold table having a systematic pattern as shown in FIG. 4e, and the data of "1" or "0" produced from such comparison of both the valued provides the processed result for each pixel position.

By the way, the processing step SX shown in FIG. 3c can be modified, for example, such that the value of R6(N)×R7(N) is computed and the resulting value is stored in the register R8(N).

Also, while both pixels having the data of "1" and "0" are allocated to the edge region (A2) in the illustrated embodiment as shown in FIG. 5a, it is alternatively possible, for example, that only those pixels having the data of "1" are allocated to the edge region, and those pixels having the data of "0" in the edge region A2 of FIG. 5a are included in another region A1, for example, to which pixels in the region A1 may be allocated the remaining data of "1". Further, various parameters for the edge sampling process and the edge enhancement process can be selected desirously. In addition, while a microcomputer is used to carry out the gradation processing with the program in the illustrated embodiment, the microcomputer may be replaced by various types of hardware devices to implement the equivalent processing. In case of using the hardware devices, the gradation processing can be carried out synchronously with the image reading operation and therefore, the most part of the large capacity buffer memory 108 can be dispensed with.

In accordance with the present invention, as fully described above, since information of the input data except for the average gradation, such as edge information, is reflected in a matrix of binary data which is handled as a unit in the gradation processing, the amount of information for each unit area is increased and the resolution is improved. The invention is particularly effective in case of recording the line drawings or character images in the binary form, which includes edge information so much.

What we claim is:

1. In a halftone digital image processing device wherein, for each unit processing region comprising a plurality of pixels, the halftone density is represented by adjusting the number of recording pixel data and the number of non recording pixel data in the unit processing region in response to the gradation of input data;

said device comprising halftone processing means adapted to determine an average gradation of the input data for each said unit processing region, sample edge information of the input data, determine a residual gradation value resulted by subtracting a value corresponding to the sampled edge information from said average gradation, and then alternately allocate the recording pixel data and the non recording pixel data to those pixels in the region from which the edge information has not been sampled, in accordance with the ratio of said residual gradation value to the number of those pixels in said unit processing region from which the edge information has not been sampled.

2. A halftone digital image processing device according to claim 1, in which when the region from which the edge information has not been sampled is divided into a plurality of regions by the sampled edge information, said halftone processing means is adapted to determine an average gradation from the input data for each of the divided regions, distribute a residual gradation value to each of the divided regions in accordance with the ratio of said average gradation between the divided regions, and then alternately allocate the recording pixel data and the non recording pixel data to those pixels in each of the divided regions in accordance with the distributed residual gradation value to the number of pixels in that region.

3. A halftone digital image processing device according to claim 1, in which said halftone processing means is adapted to first allocate the edge information to corresponding pixel locations in a memory in which are to be stored the processed results for said respective regions, then allocate an identity code different from the edge information to the remaining pixel locations, and update a value of said identity code for each division of said regions detected using the edge information.

4. A halftone digital image processing device according to claim 1, in which when the edge information is not present in the input data for each said unit processing region, said halftone processing means is adapted to compare an average gradation of the input data with each of values of a threshold table having a set of thresholds arranged in the form of a dot concentration pattern, and produce the data based on the result of said comparison.

5. In a halftone digital image processing device wherein for each unit processing region comprising a plurality of pixels, the halftone density is represented by adjusting the number of recording pixel data and the number of non recording pixel data in the unit processing region in response to the gradation of input data;

said device comprising halftone processing means; adapted to determine an average gradation of the input data for each said unit processing region, sample edge information of the input data, and determine a residual gradation value resulted by subtracting a value corresponding to the sampled edge information from said average gradation; adapted to allocated the edge information to those pixels in an edge region in corresponding locations of a memory in which are to be stored the processed results for the respective regions, then allocate an identity code different from the edge information to the remaining pixel locations, and update a value of said identity code for each division of said regions; adapted to alternately allocate the recording pixel data and the non recording pixel data to those pixels in the region from which the edge information has not been sampled, in accordance with the ratio of said residual gradation value to the number of those pixels in said unit processing region from which the edge information has not been sampled; when the region from the edge information has not been sampled as divided into a plurality of regions by the sampled edge information, adapted to determine an average gradation from the input data for each of the divided regions, distribute a residual gradation value to each of divided regions in accordance with the ratio of said average gradation between the divided regions, and alternately allocate the recording pixel data and the non recording pixel data to those pixels in each of the divided regions in accordance with the distributed residual gradation value to the number of pixels in that region; and when the edge information is not present in the input data for each said unit processing region, then adapted to compare said average gradation of the input data with each of values of a threshold table having a set of thresholds arranged in the form of a dot concentration pattern, and produce the data based on the results of said comparison.

* * * * *